United States Patent [19]
Yevick

[11] 4,060,317
[45] Nov. 29, 1977

[54] COMPACT FOLDED MIRROR RECORDER AND VIEWER OF INFORMATION

[75] Inventor: George Johannus Yevick, Leonia, N.J.

[73] Assignee: Personal Communications, Inc., Stamford, Conn.

[21] Appl. No.: 612,862

[22] Filed: Sept. 12, 1975

[51] Int. Cl.$^2$ ............ G03B 23/08; G03B 21/28
[52] U.S. Cl. .................... 353/27 R; 353/37; 353/78; 353/99
[58] Field of Search ........ 353/32, 37, 99, 78, 353/27 R, 46, 54; 350/199

[56] References Cited

U.S. PATENT DOCUMENTS

| | | | |
|---|---|---|---|
| 2,351,618 | 6/1944 | Katz | 353/78 |
| 3,592,542 | 7/1971 | Kaufer et al. | 355/54 |
| 3,765,743 | 10/1973 | Reaves et al. | 350/7 |
| 3,864,034 | 2/1975 | Yevick | 353/120 |

*Primary Examiner*—Steven L. Stephan
*Attorney, Agent, or Firm*—Thomas J. Greer, Jr.

[57] ABSTRACT

An optical projection apparatus employing lenses between 30 and 150 mils radius. The lenses are arrayed over a surface, near a photographic film which carries microimages. The microimages are projected through the lenses and against mirrors. The mirrors, termed folding mirrors, reduce the length of the projections in a direction along the optic axes of the lenses. The folding mirrors effectively reduce the throwing distance of the lenses thus reducing the thickness of the apparatus. The apparatus is also used to record.

2 Claims, 24 Drawing Figures

FIG. 5
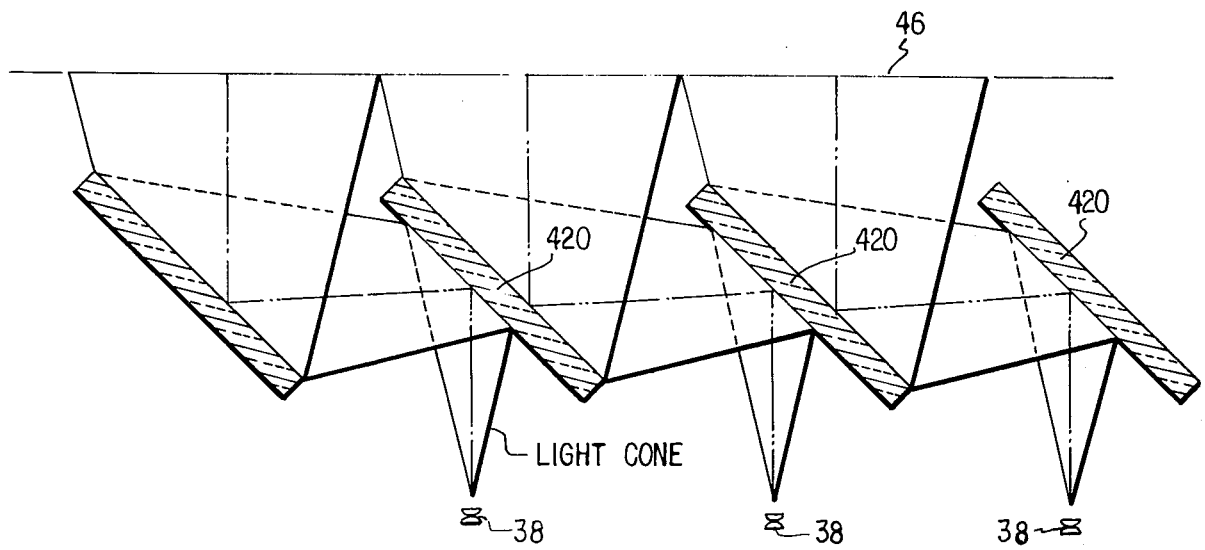
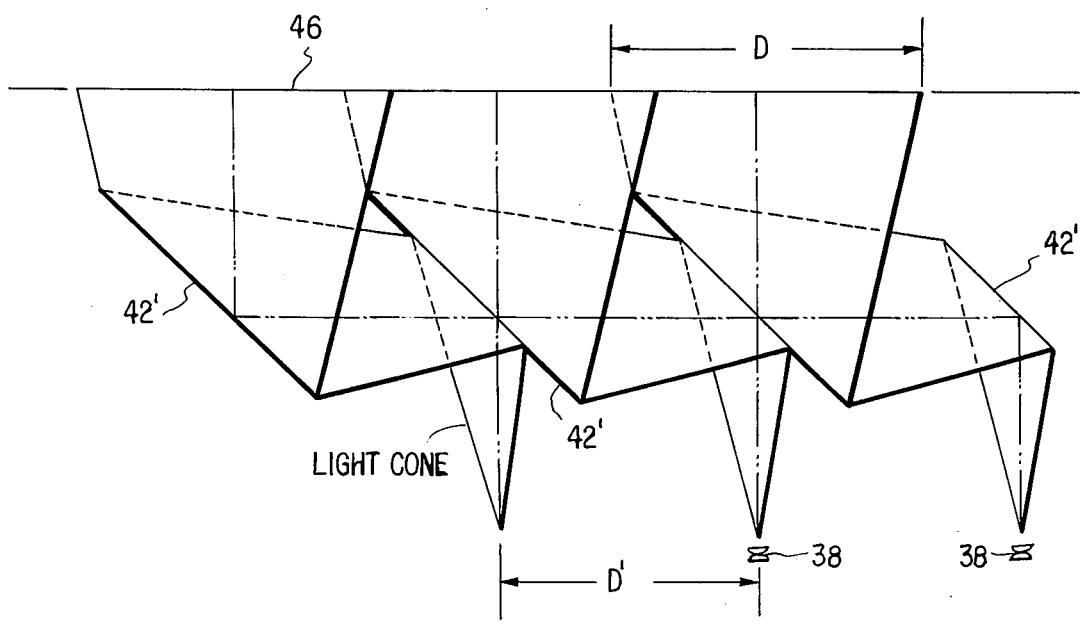
FIG. 6

FIG. 16
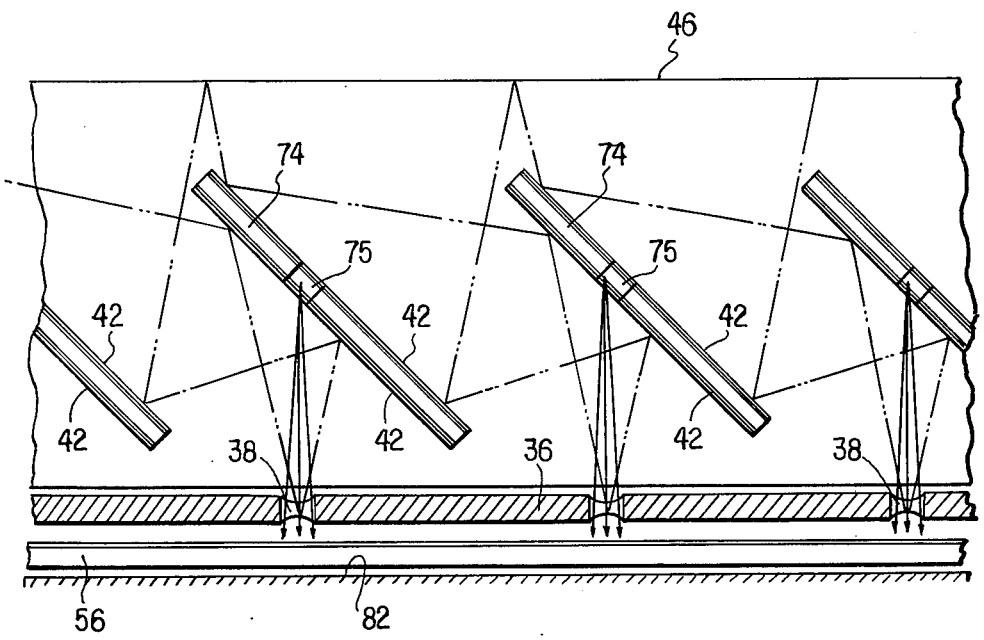
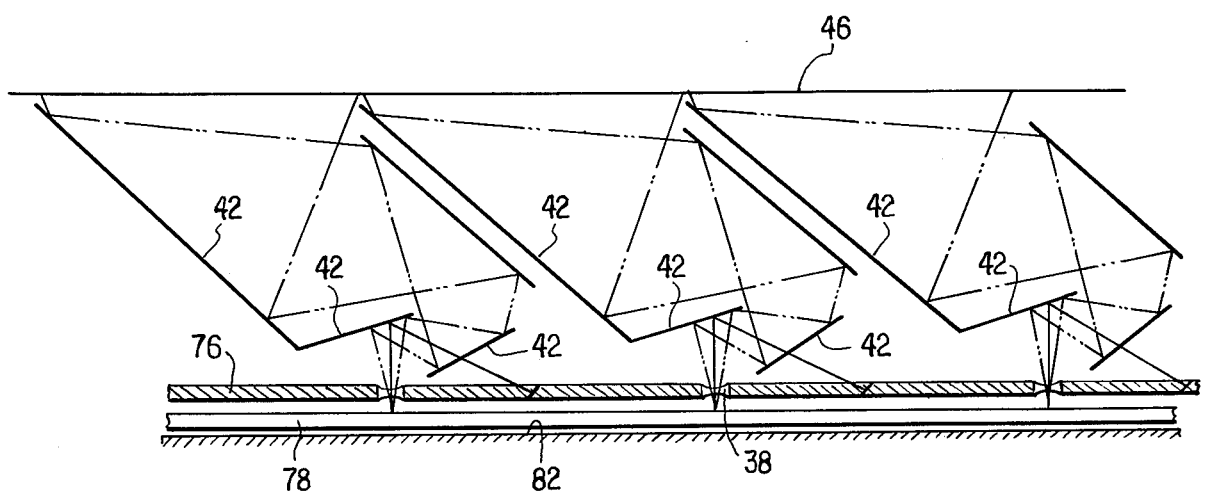
FIG. 17

COMPACT FOLDED MIRROR RECORDER AND VIEWER OF INFORMATION

The use of a large number of small lenses to record and later to view information, to make possible inexpensive compact recording and viewing devices, has been disclosed in U.S. Pat. No. 3,704,068 to Waly. In that patent intelligence is distributed by a multiplicity of tiny lenses whose positions are fixed with respect to information in the form of microimages interspersed on a microfiche. In my U.S. Pat. Nos. 3,864,034, 3,859,395, 3,865,485, and 3,824,609, modifications of this concept include what is termed a lensfiche. In a lensfiche the information on the photographic film (of a microfiche) is fixed relative to the tiny lenses (lensettes) of the microfiche. The microfiches of these patents carry microimages which correspond to recorded scenes, the latter termed macro scenes. The microimages which correspond to any macro scene are dispersed over the area of the microfiches. Thus to read out a macro scene, simultaneous optical projection of spaced apart regions of the microfiches is required.

The present invention represents a further modification of the concepts disclosed in the above Waly patent, this modification making possible a more economical realization of compact recording and viewing devices.

For purposes of the following discussion, lenses will be arbitrarily designated as follows. A lens employed in projection and recording devices which is less than 30 mils in radius will be called a micro lens. Lenses having a radius between 30 mils and 150 mils will be termed mini lenses. Lenses having a radius greater than 150 miles will be termed macro lenses. Reference to Table I will further define the comparison between these three classes of lenses.

TABLE I (All lengths in Mils)
COMPARISON OF DIFFERENT CLASSES OF LENSES

| | Type of Lens | Micro-lens | Minilens | Macro-lens |
|---|---|---|---|---|
| 2. | Radius of Curvature R | R<30 | 30<R<150 | 150<R |
| 3. | Focal Length (Plano- ($\mu$=1.5) f Convex) | f<60 | 60<f<300 | 300<f |
| 4. | Throwing Distance L for magnification 30 | L<1800 | 1800<L<9000 | 9000<L |
| 5. | Focal length (double ($\mu$=1.5) f Convex) | f<30 | 30<f<150 | 150<f |
| 6. | Throwing distance L for Magnification 30 | L<900 | 900<L<4500 | 4500<L |
| 7. | Approx. Thickness H of apparatus for straight up projection | H<1200 | 1200<H<5000 | 5000<H |

The application of micro lenses for the storage and retrieval of information is utilized by means of a lensfiche. Clearly, macro lenses are prohibited because they cannot yield compact storage and retrieval of information. According to the practice of this invention, compact storage and retrieval of information may be realized by the use of mini lenses, despite their apparent excessive throwing distances. In accordance with the practice of this invention, a throwing distance of the order of one inch may be tolerated by using a multiplicity of mirrors in combination with the lenses. The mirrors are termed folding mirrors for a reason which will become apparent. By the use of mini lenses the advantage of relative ease of fabrication over micro lenses are enjoyed. Further, only relatively few are required to span or accommodate relatively large recording and/or viewing areas. Their use permits substantial manufacturing tolerances to thereby admit of relatively inexpensive, so-called fool-proof manufacturing and use. As a practical matter, there are few if any problems in the use and fabrication of mini lens devices as compact readers and cameras.

It is necessary to refer hereafter to a reduction ratio R which is defined as the ratio of distance between the lens array and the viewing screen to the throwing distance of the lenses in the same array.

Referring now to the drawings:

FIG. 5 is a view similar to FIG. 4b and shows an arrangement of mirrors of finite thickness.

FIG. 6 is a view similar to FIG. 5 and illustrates a folding mirror arrangement which yields overlapping of the projected and folded light cones.

Figure 15:
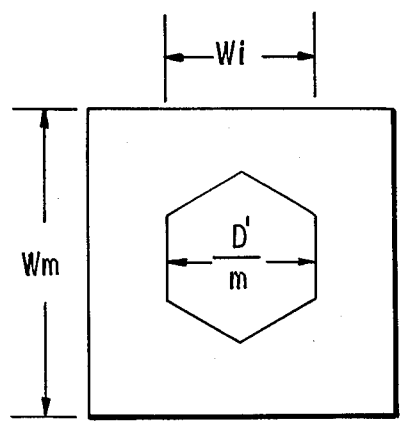

FIG. 15 schematically illustrates a lighting configuration and indicates the ratio of the image area on the photographic emulsion to a projected area.

FIG. 16 is a schematic view illustrating certain lighting sheets which provide Köhler front illuminations.

FIG. 17 is a view illustrating a direct front lighting system employing a lighting sheet.

Figure 18:
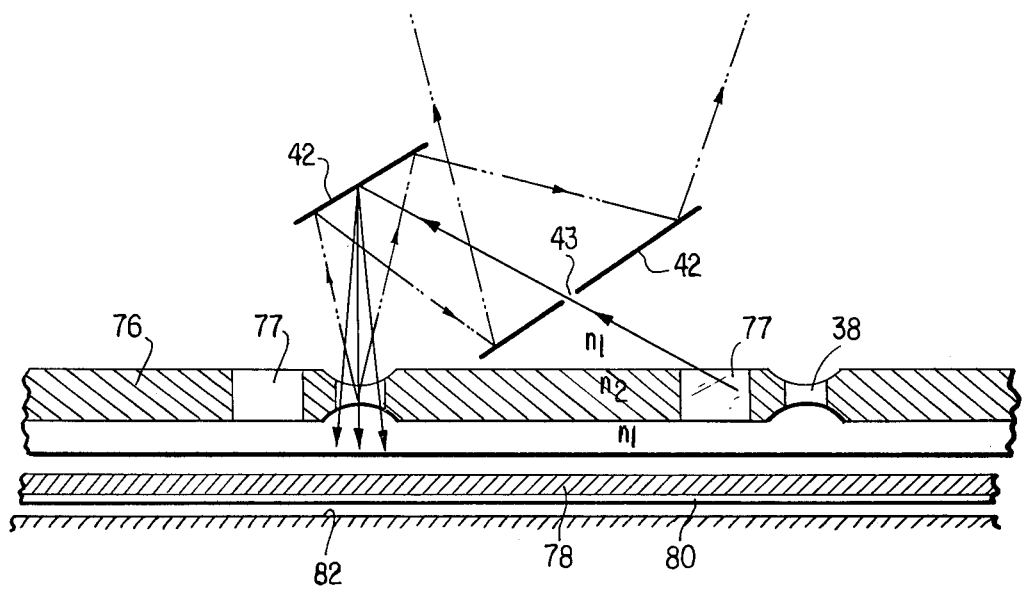

FIG. 18 shows an enlarged view of the arrangement of FIG. 17.

Figure 19:
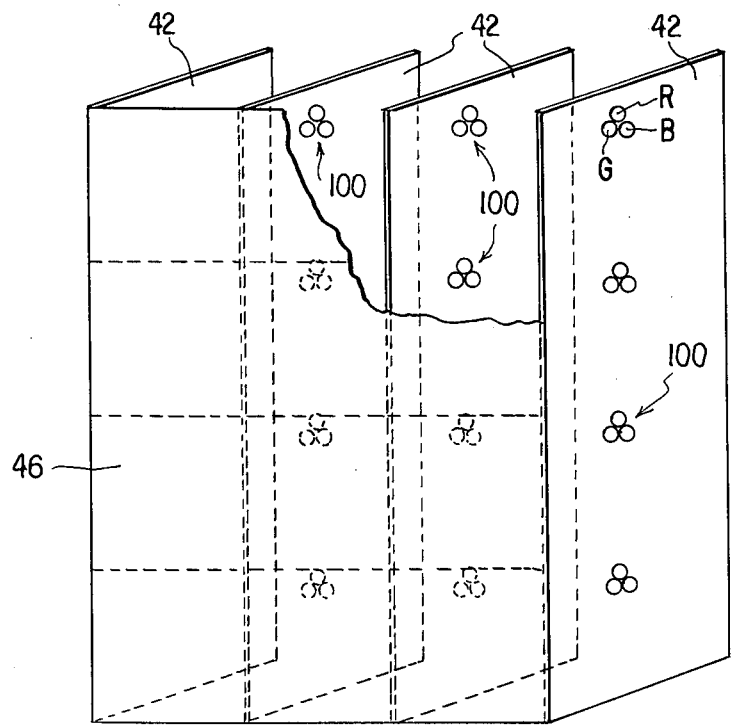

FIG. 19 is a schematic view indicating how a mini lens device of this invention which employs black and white film generates colored scenes.

Figure 20A:
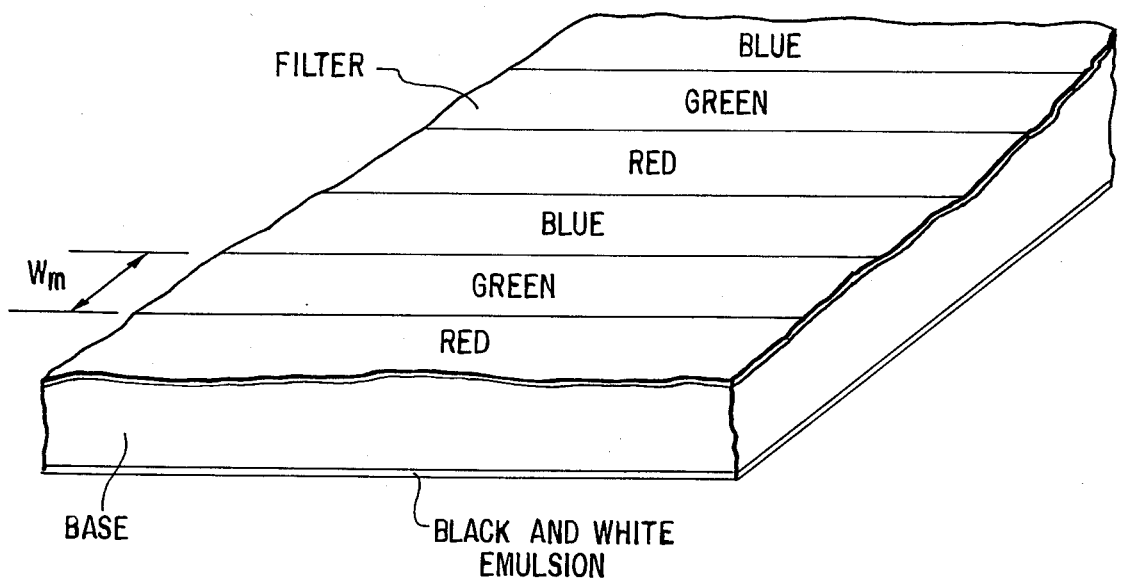

FIG. 20a is a view showing a strip of color filters positioned on a base or substrate.

Figure 20B:
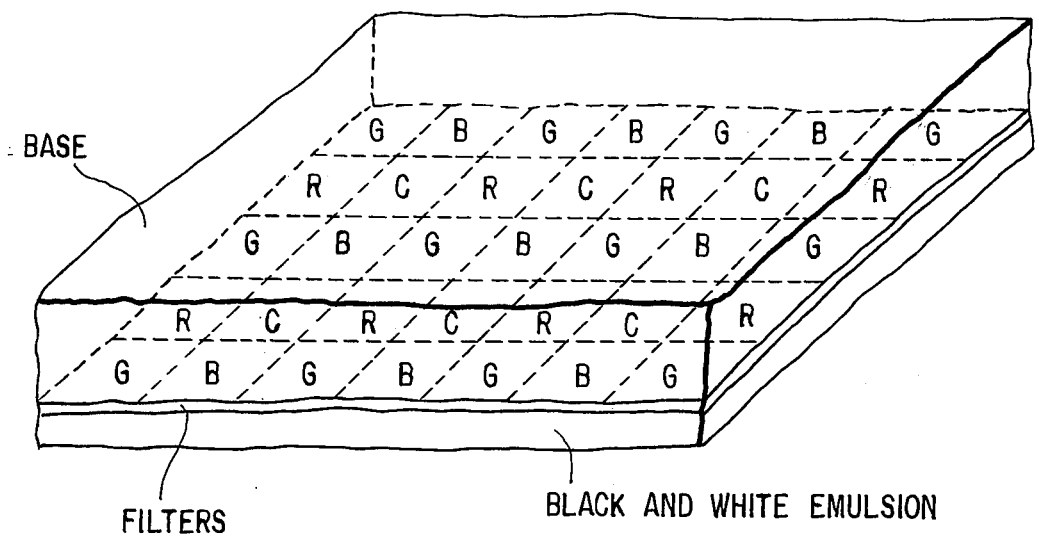

FIG. 20b is a view similar to FIG. 20a shows primary color filters positioned between a supporting substrate or base and a photographic emulsion.

Figure 21:
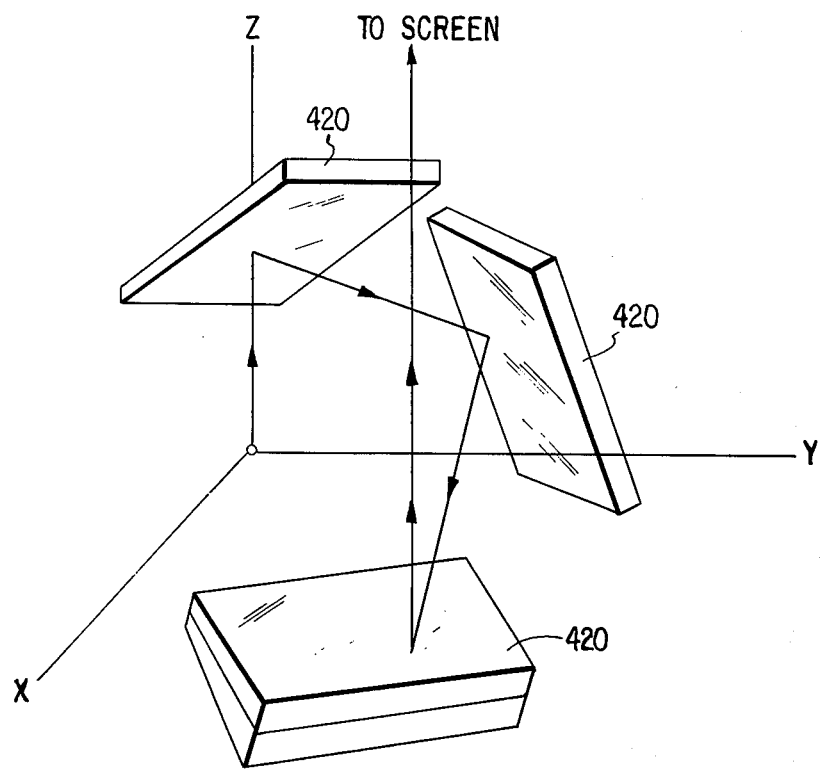

FIG. 21 is a schematic view indicating the folding of light cones by skewed mirrors.

Figure 1:
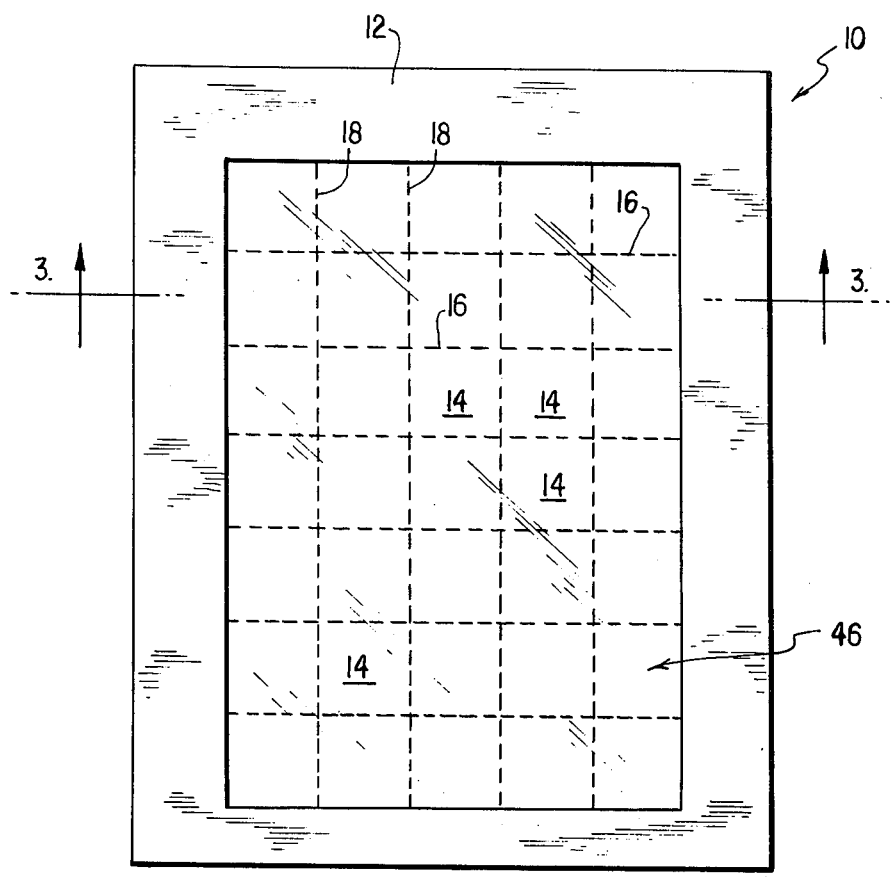
FIG. 1 is a plan view of a compact, book-size-mini lens recorder and/or viewer.
Figure 3:
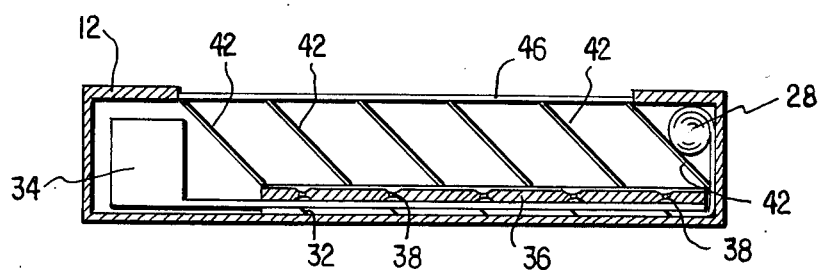
FIG. 3 is a cross-section of the viewer taken along section 3—3 of FIG. 1.
Figure 2:
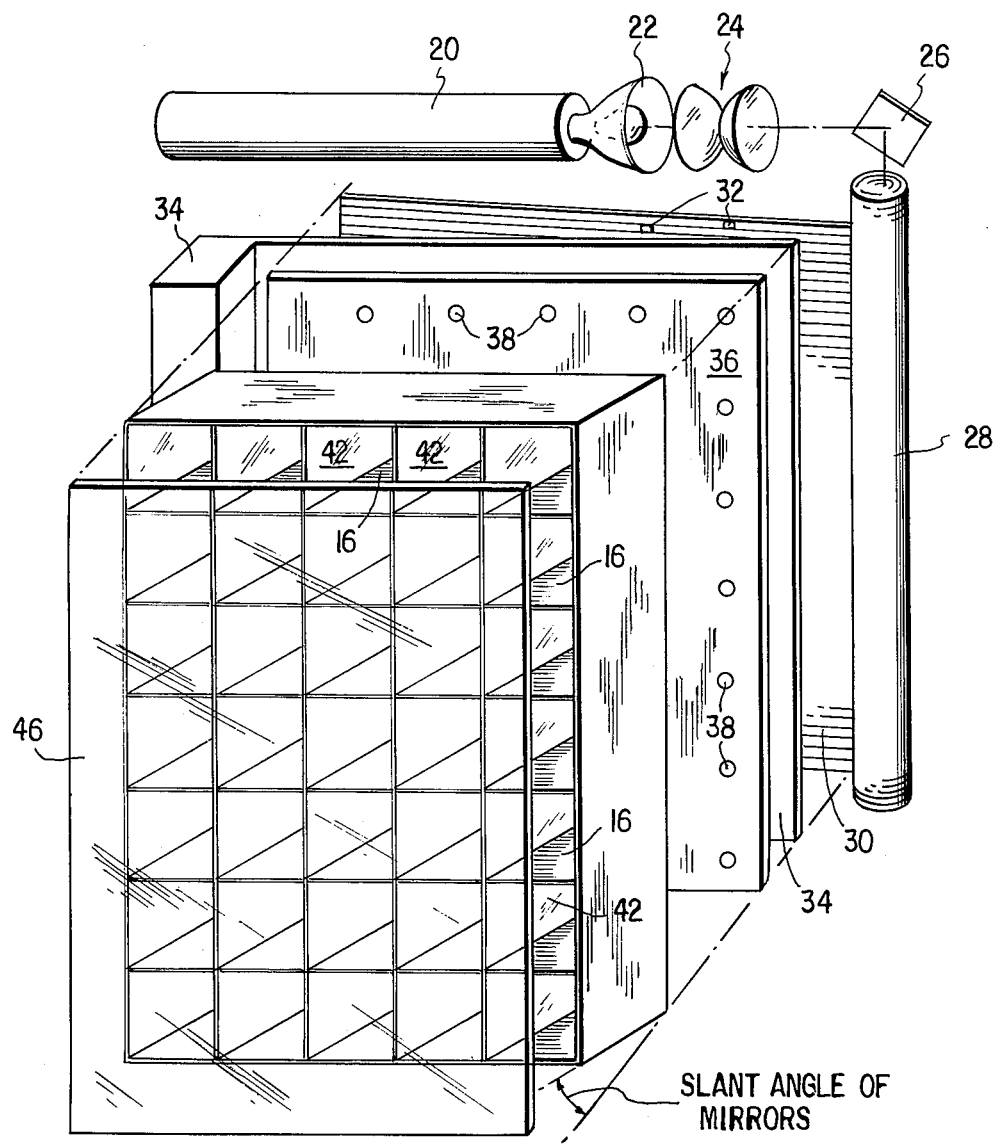
FIG. 2 is a perspective exploded view of the viewer of FIG. 1.

Referring now to FIGS. 1, 2 and 3 of the drawings, the numeral 10 denotes generally the projection apparatus of this invention and is in the general form of a parallelpiped and is of a size, typically, 4½ inches × 5½ inches × 1 inch. The front of the apparatus includes a viewing screen denoted by the numeral 46 surrounded by a border 12. The dashed lines denoted by the numeral 16 denotes the edges of opaque septa, while the numerals 18 denote the front edges of certain folding mirrors 42, both later to be described. The numeral 14 denotes individual cells which together form the entire area of viewing screen 46.

Referring now specifically to FIG. 2, an exploded, perspective view of the main components of the apparatus is illustrated. The various elements to be described in connection with FIG. 2 are placed within a housing having the general shape described above and shown at FIG. 1. At FIG. 2, the numeral 20 denotes a battery or power source which energizes an incandescent source of illumination denoted by the numeral 22 having an associated reflector. The numeral 24 denotes a condenser lens system for collimating the light, the light falling upon a mirror 26. Light from the mirror 26 passes in one end of a light trunk denoted by the numeral 28. The trunk has an integral side extension defining a light sheet denoted by the numeral 30. The light sheet is provided with small reflectors 32 at regularly spaced locations thereover. The construction of light trunk 28 and lighting sheet 30 is fully described in copending application Ser. No. 536,409 by Lawrence W. Grunberger, filed Dec. 26, 1974 commonly assigned, and hereby incorporated by reference.

The numeral 34 denotes a carrier and indexing support for photographic film. The carrier is provided with apertures (not illustrated) for the transmission of light from reflector 32 through the carrier 34. The numeral 36 denoes an opaque aperture plate provided with a plurality of lenses 38 at regularly spaced intervals thereover. In practice, the lenses are formed from two transparent plates each having convex nodules on one surface. The plates sandwich an apertured, opaque plate such that a pair of nodules, one of each from each plate, are aligned at an aperture. Thus, two plano-convex nodules are aligned either plano to plano, or convex to convex. In either case, a double convex lens at each aperture of the opaque plate is defined. The lenses 38, the through apertures on film holder 34, and the reflectors 32 on light conducting sheet 30 are all aligned. Light from each reflector 32 will pass through its corresponding and unique aperture in transport member 34 through a microimage on the film and thence through a unique lens 38.

The numeral 42 denotes any one of a plurality of generally elongated mirrors silvered on both sides, excepting the end-most ones. A plurality of opaque septa 16 extends between the mirrors to thereby define openended cells 14. Reference to FIG. 3 of the drawings, together with FIG. 2, will make plain the spatial orientation and arrangement of mirrors 42. They are termed folding mirrors for a reason which will become apparent. The numeral 46 denotes a viewing screen termed a rear projection screen adapted to receive light from lenses 38 which has been reflected from the mirrors.

Figures 4A, 4B:
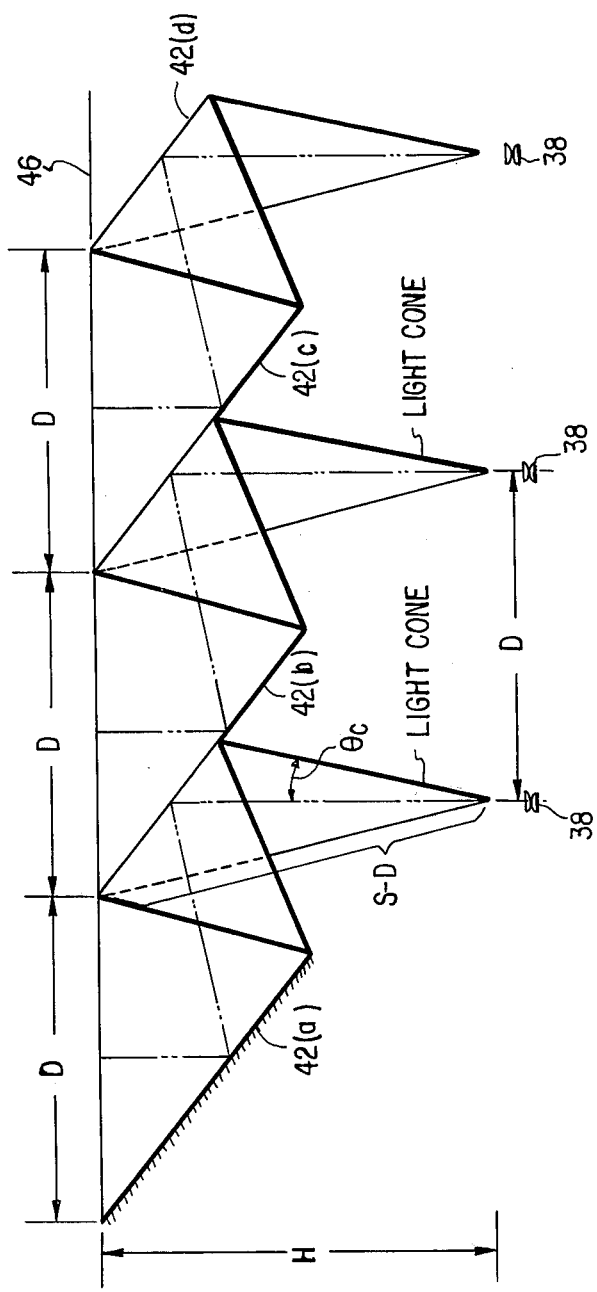
FIG. 4a is a view of a typical light cone projected from a typical mini lens of this invention.
FIG. 4b illustrates the folding of the light cone of FIG. 4a by the action of a plurality of mirrors.

Referring now to FIGS. 4a and 4b, a light cone projected through a typical mini lens 38 is indicated. The light cone has a length or throwing distance denoted by L. The half-angle of the light cone is denoted by $\theta_c$. Reference now to FIG. 4b and FIG. 3 will illustrate the folding action of the mirrors 42.

The device thus far described operates in the following manner as a projection apparatus. Assuming one to already have a photographic emulsion with plurality of microimages therein, light is projected from the lamp 22 and finds its way through the indicated optical path to the Grunberger reflectors 32. The light passes through the previously-described apertures in transport element 34 and through the photographic emulsion and thence through the mini lenses 38. Each mini lens 38, as previously indicated, is associated with a single unique cell 14 whose front outline is indicated at FIG. 1 of the drawings. By reference to FIGS. 3 and 4b, the output of each mini lens 38 is projected on one side of a mirror 42. From here, it is reflected to a parallel mirror 42 and is thence reflected onto screen 46 for rear illumination thereof. This is repeated over the entire area of viewing screen 46 with the result that each cell 14 contributes its proportionate share to the entire image on the screen seen by the viewer.

The reader will now be in a position to comprehend that the thickness of the viewer has been reduced from a value L being the height of a cone to the value H.

While not necessary for a complete understanding of the invention, the following analysis will illustrate quantitatively how the mirrors 42 diminish the thickness of a microimage viewer: The light cone of FIG. (4a) can be circular, square, rectangular, hexagonal, etc., in cross-section so long as they mesh on the viewing screen. Consider the case where the initial axis of the light cone and the final axis are parallel, although this need not be the case. Let the length of the cone be L and the top diameter D.

Let $\theta_c$ be the half cone angle. Clearly $$D/2 = L \tan \theta_c \tag{1}$$

and the slant of the cone has a length S, $$S = L/\cos \theta_c \tag{2}$$

FIG. (4b) illustrates the situation for minimum height H where the cones just touch and where there is full area coverage of the screen. If the cones are circular in cross-section there will be gaps and one must define D suitably, keeping in mind that overlap must now prevail if the full area of the screen is to be covered. Any configuration other than FIG. (4b) increases H.

The minimum H is given as follows. Referring to FIG. 4b, the left slant ray of length S of the left light cone strikes the upper tip of the mirror 42(b) and proceeds along and just under the screen until it hits the top edge of mirror 42(a) and then reflects onto the screen 46. Thus, the total length S of the slant ray is divided into two parts, D and S−D. Hence, the height H is given by $$\cos \theta_c = H/(S-D)$$

Hence, $$H = (S-D) \cos \theta_c \tag{3}$$

Substituting Eqs. (1) and (2) into Eq. (3) yields $$H = L(1-2\sin\theta_c) \tag{4}$$

The ratio R of height to throwing distance L is given by
$$R = H/L = 1-2\sin\theta_c \tag{5}$$

For a half cone angle of 12°, R = 0.58. A half cone angle of 14.50 yields R = 0.5.

Referring now to FIG. 6 of the drawings, a construction is illustrated wherein the light cones overlap. This case is of importance whenever redundancy of information is desired so as to facilitate tracking or positioning of the microfiche or film which carries the microimages.

Figure 7:
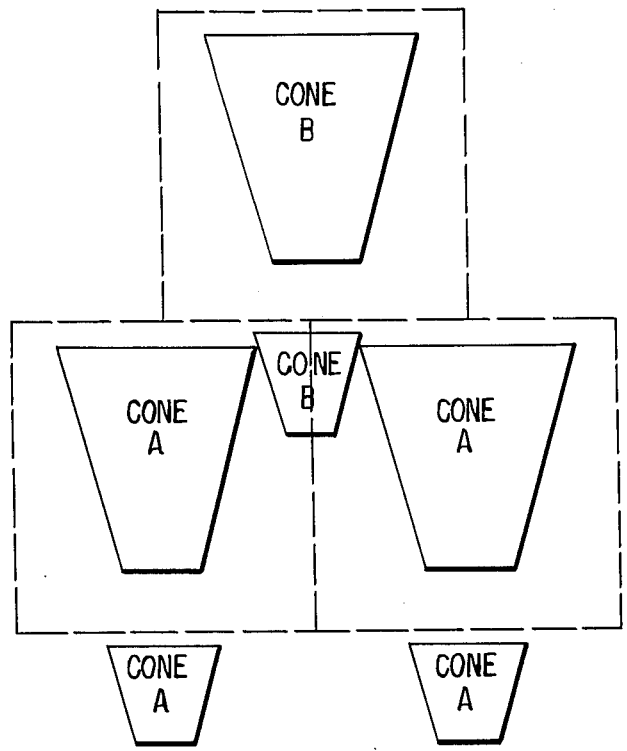
FIG. 7 is a schematic view showing the folding mirrors as they would appear looking down onto the viewing screen.
Figure 8:
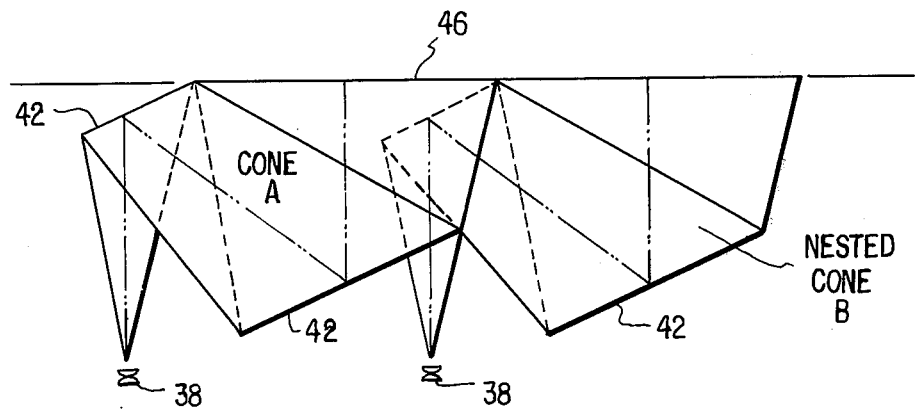
FIG. 8 is a schematic side view of FIG. 7.
Figure 8A:
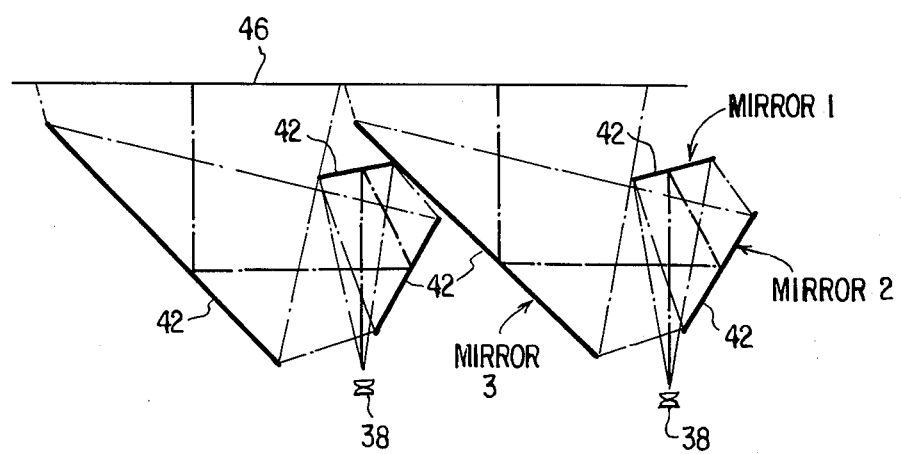
FIG. 8a is a view showing a folding mirror arrangement employing three mirrors and yielding a reduction ratio of R=0.388.

Referring now to FIG. 7, a construction is shown wherein the mirrors are nested for the purpose of making R smaller than possible with a configuration such as that of FIG. 4b. The reader will note that the folding mirrors are of truncated triangular shape and correspond to the indicated cones. FIG. 8 further shows the side view of this construction wherein the mirrors 42 are nested and staggered relative to each other for the purpose of further reducing the thickness of the viewing device. In essence, the first mirror snuggles between the two second mirrors belonging to two neighboring light cones. This construction is, however, not as convenient to fabricate as that indicated in FIG. 4b of the drawing wherein the mirrors may be regarded as a set of tilted, parallel strips such as venetian blinds. FIG. 8a illustrates a construction wherein each light cone is effectively folded three times to thereby lessen the thickness of the reader. The height reduction ratio is R = 0.388. As indicated, three mirrors, each silvered on one surface thereof, are employed.

Figure 9:
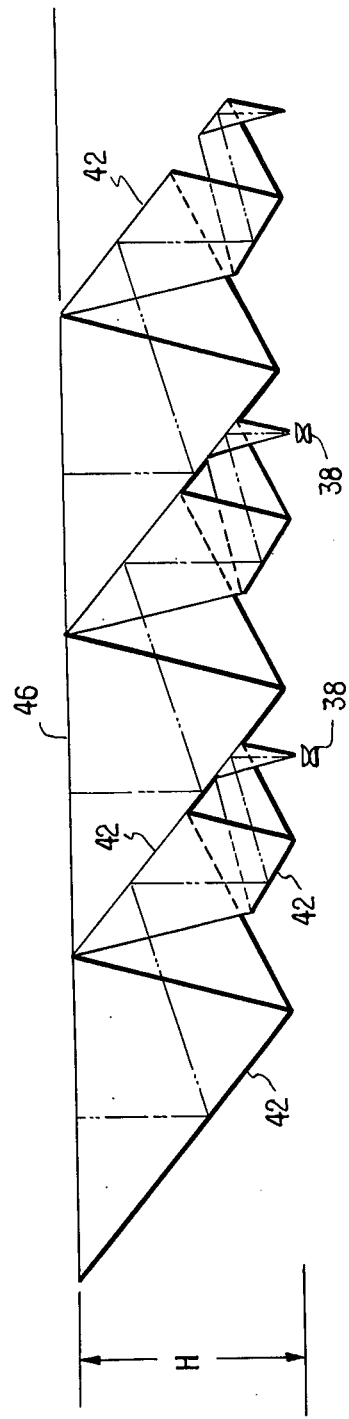
FIG. 9 is a view of an example of light cones of FIG. 4a undergoing four reflections in a system with a reduction ratio 0.32.
Figure 10:
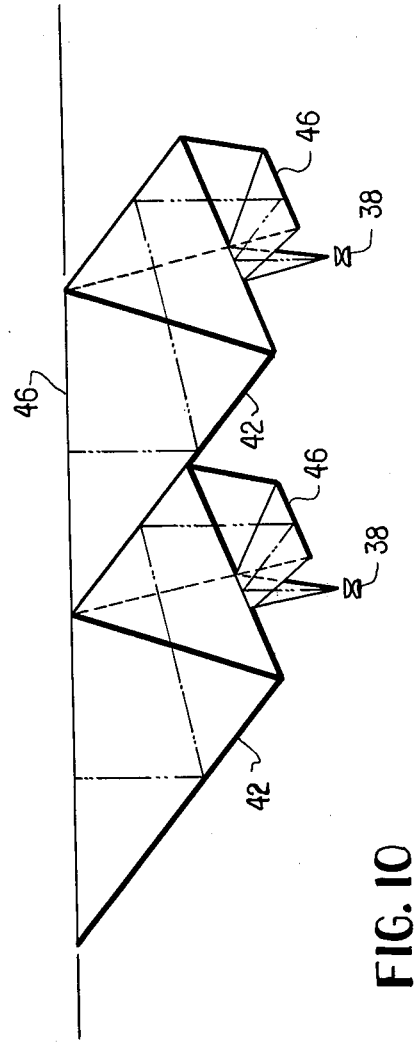
FIG. 10 is a schematic view showing a typical folding of a light cone such as shown in FIG. 4a by four reflections from the folding mirrors which folding is characterized by a reduction ratio 0.35.

The reader will now be in a position to note that in general as the number of reflections increases the height decreases, i.e., the thickness of the entire device decreases. FIG. 9 indicates a construction wherein four reflections are achieved by using two two-sided mirrors and one one-sided mirror. With such a construction, the reduction ratio R may be made quite low and may be made equal to 0.32. For a half-cone angle of 12°, the mirrors 42 at FIG. 9 are tilted at 45° and two of them extend throughout the thickness H and the second one must be smaller than H in order not to cut into the light cone. The calculation of the minimum height H is straightforward but is not presented since it is not necessary to an understanding of the invention. At FIG. 9, the tip of the cone extends to the far end of each cell. If desired, however, the apex may be located near the center of each cell, as indicated at FIG. 10 of the drawings. However, the reduction ratio R for the construction in FIG. 10 is not as low as that possible with the construction indicated in FIG. 9.

Figure 11:
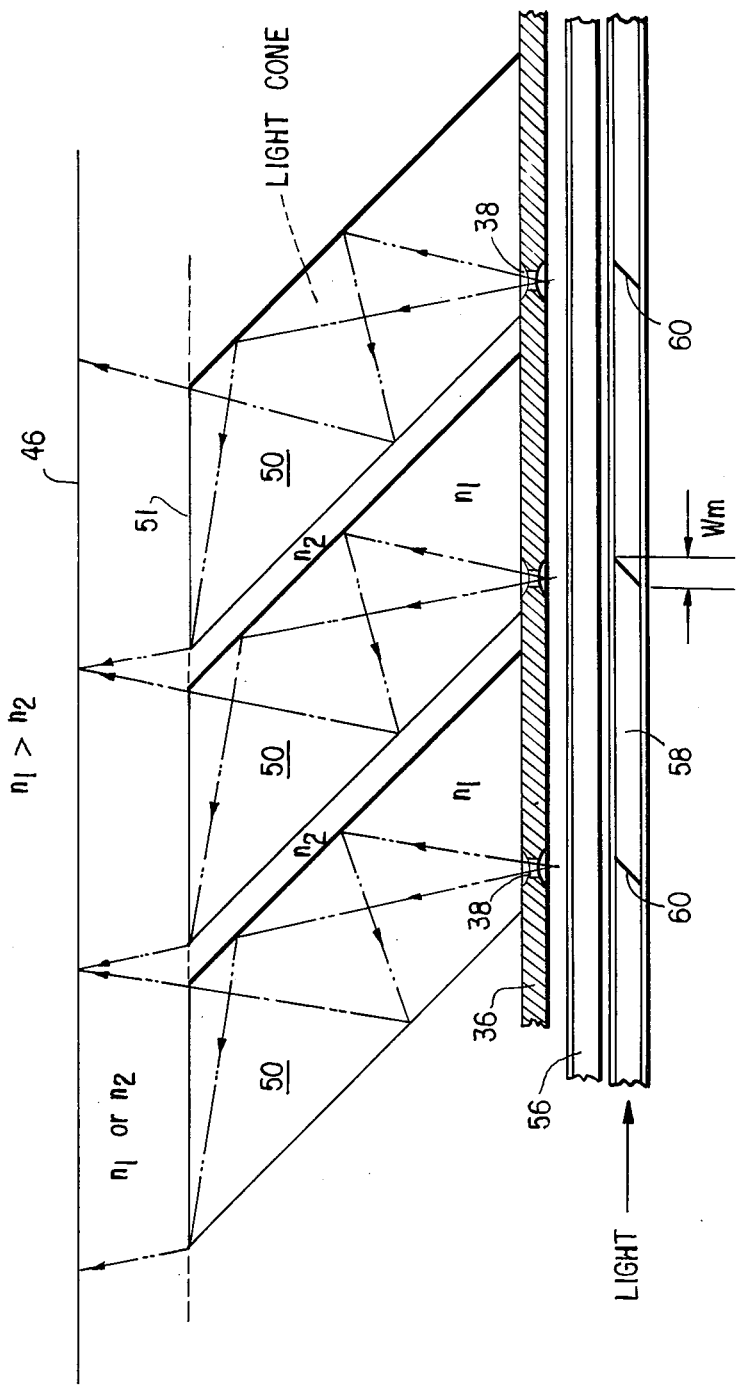
FIG. 11 is a partially schematic view indicating the folding of light cones by means of totally internally reflecting surface prisms in lieu of mirrors.

Because of the fact that multiple reflections from mirrors result in a loss of light with each reflection, the use of reflecting prisms may be employed in certain applications. Light is totally and entirely reflected from a prism if the angle of incidence of any ray in the light cone is greater than the critical angle, as is well known in the optic art. In order to apply this principle to the present invention, a portion of the light cone must reside in a medium whose index of refraction is larger (the larger the better) compared to the optical medium (usually air) on the other side of the totally internally reflecting surface. FIG. 11 illustrates a construction wherein very nearly total reflection is enjoyed simply by providing a slight air gap between successive prisms. The prisms are denoted by the numeral 50 in the general form of parallelipipeds. The numeral 51 denotes a boundary at one end of the elements 50. A material whose index of refraction is either $n_1$ or $n_2$ is positioned between 51 and the screen 46. The numeral 56 denotes a microfiche of any conventional construction, numeral 58 denoting a Grunberger lighting sheet having spaced mirrors 60. The operation is indicated by an outline of a typical light cone projected from a mini lens 38.

Figure 12:
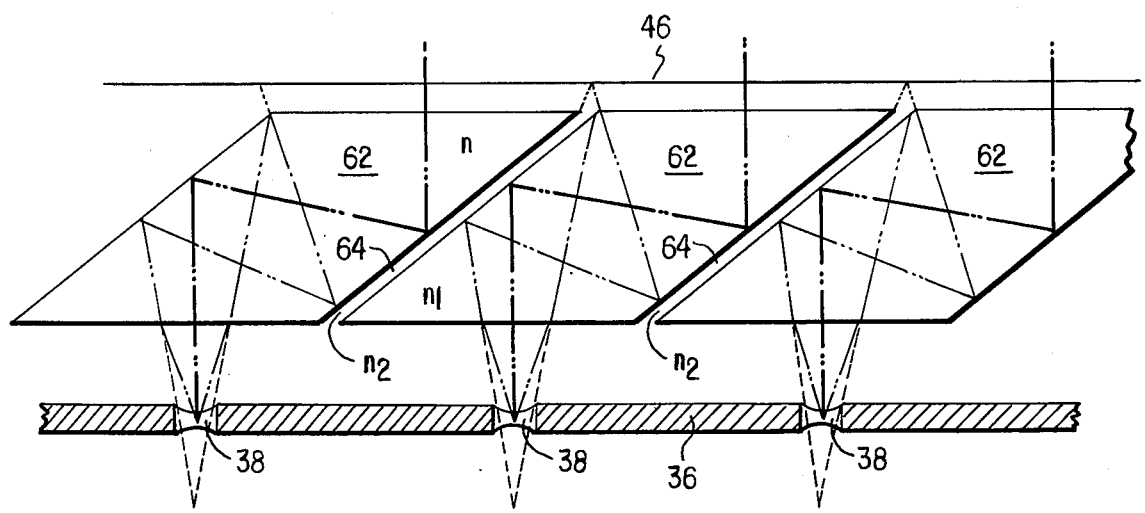
FIG. 12 is a view of a portion of the light cones inside a totally internally reflecting prism arrangement wherein the cone apices are positioned outside of the prisms.

In FIG. 12 a variant of the construction illustrated in FIG. 11 is shown wherein the apex of each light cone lies outside of the several prisms 62. The prisms 62 are separated by air gaps 64. The construction indicated in FIG. 12 differs from that shown in FIG. 11 in that the former admits of a larger cone angle.

Figure 14:
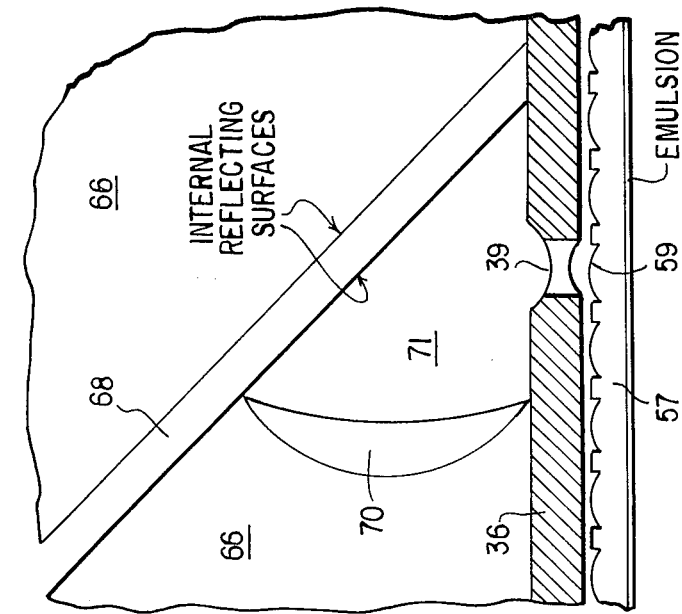
FIG. 14 is a view showing a lensfiche combined with the telecentric mini lens system of FIG. 13.
Figure 13:
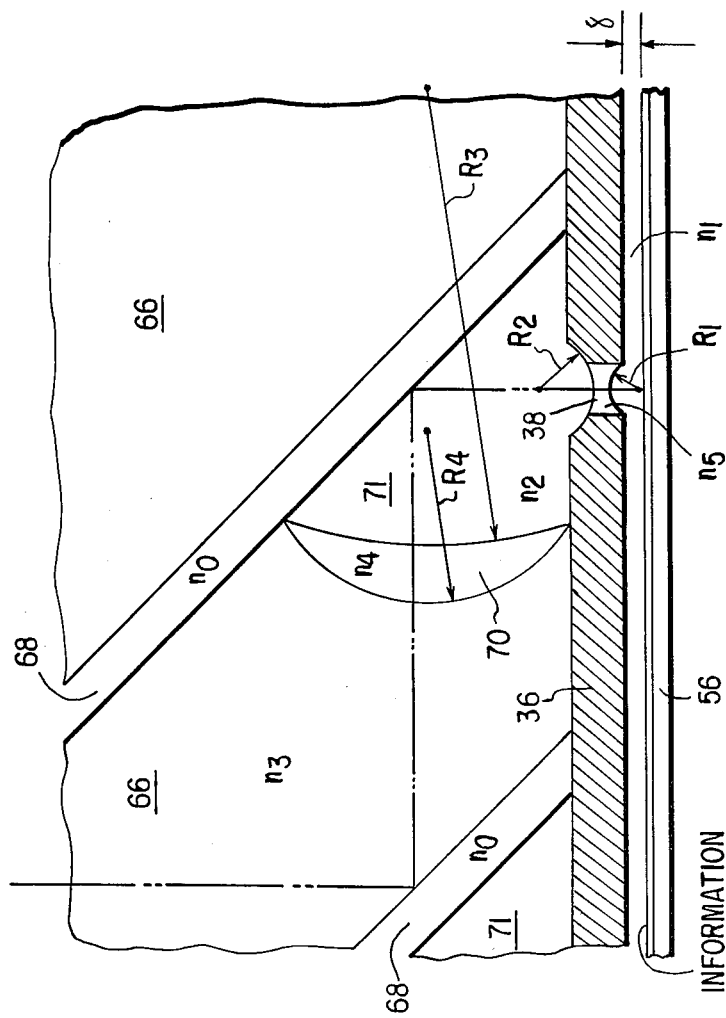
FIG. 13 is a view of a telecentric mini lens system build into the prism and having very short focal lengths.

In FIG. 13 a construction is shown wherein a microfiche 56 carrying a photographic emulsion thereon is positioned just beneath an aperture plate 36. Each lens 38 may be defined by two different radii of curvature. Again, as in the construction of FIG. 12, totally internally reflecting prisms 66 are employed in conjunction with gaps 68 therebetween. The screen 46 is not indicated at FIG. 13. Additionally, a prism 71 may be employed in conjunction with each lens 38, there being a gap, usually air, denoted by the numeral 70 between prisms 66 and 71. The radii of curvature of the surfaces of gap 70 may be varied according to a particular application. An important application of the applicable system indicated in FIG. 13 is that if the first lens at or near the apex of a light cone is a positive lens and if the second lens is negative (as indicated in the figure) then the effective focal length of the system may be made extremely short. The consequence of this is indicated at FIG. 14 wherein the construction of FIG. 13 allows the use of the lensfiche concept illustrated in my several patents such as U.S. Pat. No. 3,864,034. Because the effective focal length is so short, the intelligence may be connected or tied to an optical surface such as one of the radii of curvature of lens 38.

In any embodiment of the invention, the illumination must be larger than the extent of the microimage on the photographic emulsion for the purpose of providing redundancy of information in the event that microfiche changes its dimensions due to environmental variations such as temperature and humidity change. A redundancy ratio $r$ may be defined by reference to FIG. 15 as $r = W_m/W_i$. $W_m$ is the width of illumination at the emulsion and $W_i$ is the effect of the extent of the image on the screen. For the case of no overlap of light cones, $W_i = D/M$ and for the case of overlap of light cones, such as in FIG. 6, $W_i$ is defined as $$W_i = \frac{\text{mini lens nearest neighbor spacing}}{\text{magnification}}$$

The redundancy ratio $r$ must be so chosen that all contingencies mentioned above are amply provided for. The greater the redundancy ratio, the less the number of frames. To compensate for this, the higher the magnification the greater the throwing distance. Reference now to FIG. 16 illustrates an embodiment wherein illumination of the microimages is carried out using light sheets such as shown in the Grunberger application mentioned above.

Referring now to FIG. 16 of the drawings, an embodiment of the invention is illustrated wherein lighting for the microimages on the photographic emulsion is from the front of the emulsion and is provided by lighting sheets similar to those described in the Grunberger application, above mentioned. The numeral 74 denotes such a Grunberger sheet, the sheet carrying a plurality of reflectors denoted by the numeral 75 over its area. Mirrors 42 cover both sides of Grunberger sheet 74 except at those regions immediately adjacent reflectors 75. As will be noticed by reference to the lower portion of FIG. 16, a microfiche denoted by the numeral 56 carries photographic emulsion on its bottom surface, the microfiche resting on a reflecting surface denoted by the numeral 82. The aperture plate 36 having mini lenses 38 is positioned as indicated. In operation, light from the Grunberger sheets is projected along the sheets, in their planes, i.e., normal to the plane of the drawing, until it strikes the several reflectors 75. It then exits from the reflectors at a downward direction, normal to the aperture plate 36. A typical light ray exiting from the reflector 75 will pass through the lens 38, and on to the reflecting surface 82. It will then be reflected back and upwardly through the photographic emulsion which carries the microimages, again passing through lens 38 only now in an upward direction and then on to a mirror 42. From there it is reflected across to another mirror 42 and then to the viewing screen 46. In order to view the next scene, the microfiche 56 is simply indexed so that the next set of microimages is aligned with the several mini lenses 38. The small openings in the lower mirrors 42 to accommodate light exiting from reflectors 75 will not seriously effect the quality of the final image as viewed on the screen.

Referring now to FIGS. 17 and 18 of the drawings, still another embodiment employing a Grunberger type lighting sheet is employed. As before, the numeral 46 denotes a viewing screen and the numeral 42 denotes generally a mirror. Again, a microfiche of any desired construction, here denoted by the numeral 78 and carrying on its bottom surface a photographic emulsion 80 having microimages therein is positioned on a supporting substrate or base whose top surface is a reflecting surface denoted by the numeral 82. Numeral 76 denotes an element similar to the previously described aperture plate 36, but is here in the form of a Grunberger sheet having reflectors 77 dispersed over its area. As before, the numeral 38 denotes any one of the mini lenses distributed over the element 76. The reader will now be in a position to note that element 76 is a combination of the previously described aperture plate 36 and a Grunberger lighting sheet. In operation, the microfiche 78 is positioned so that a set of its micro-images is suitably positioned relative to the mini lens elements 38. The lighting sheet 76 is illuminated by passing along its plane, being normal to the plane of the paper, with the light striking the several reflectors 77 and passes through small openings 43 in the indicated mirror 42. Next, it strikes another mirror and passes downward, normally to the microfiche. As before, the light continues its pass through the microfiche until it strikes reflecting surface 82, upon its passing upwardly from 82, it is modulated, so to speak, by an associated microimage directly beneath lens 38 and passes upwardly through the lens 38 onto a mirror 42 for subsequent reflection to another mirror 42 and then to viewing screen 46. Again, the quality of the image is not seriously affected by the presence of openings 43.

Referring now to FIG. 19 of the drawings, an arrangement is schematically indicated for generating colored pictures on the viewing screening. The same principles which are set out in my prior U.S. Pat. No. 3,824,609 as applied. The numeral 100 denotes in general a triad of color filters as, for example, filters for the colors green, blue and red. Each triad contains these three different color filters. The color filters may be placed on either of the two mini lens surfaces or above the lenses or below the lenses. In FIG. 19, the plane of the triads 100 would accordingly be approximately the plane of the mini lens elements 38, in those FIGS. 2 and 3, for example. It is important to recognize that the laying down of the color filters directly on a film having no lenses on it is relatively easy because the areas for printing the dyes are large.

Referring now to FIGS. 20a and 20b, a case is shown at FIG. 20a wherein the filters are in the form of strips on the top of a transparent base. The several strips are denoted by RGB, as indicated. FIG. 20b shows a square ray of color filters denoted by BGR, each square being completed by a clear area (of no color) denoted by C. The sequence is repeated throughout the mosaic or the area of the microfiche. Thus, in the arrangement of 20b, the color filters are placed between the black and white emulsion and the transparent base or substrate of the microfiche, while in FIG. 28, the color filters are placed on top of the base. In both of these arrangements, allowance for chromatic aberration may be made by varying the radii of curvature of each mini lens of a triad so that the focal length of all light passing through them is the same. This will insure that the image in recording is in sharp focus on the emulsion and in readout is in sharp focus on viewing. Such variation in radius of curvature is set out in my U.S. Pat. No. 3,903,531.

Referring now to FIG. 21 of the drawings, there is illustrated an arrangement employing skew mirrors denoted by the numeral 420. Because of difficulty of illustration, the arrangement is only indicated. Here, a ray of light directed upwardly along the axis Z from a typical lens 38 strikes the first mirror, against the other two skew mirrors and then into the viewing screen.

While the description has been given with respect to planar mirrors, it will be understood that non-planar mirrors may be utilized, as for correcting simple lens abberations.

The description has treated the several modifications as exhibiting utility as projection devices, however, they may also be employed to photographically record information. The recording of information is achieved, either by placing a master transparency to be copied at the position where the viewing screen is located in the viewing phase and the virgin emulsion positioned where the developed microfiche is located in the viewing phase, or by projecting onto the viewing screen an image which is then recorded on virgin film.

I claim:
1. A compact optical device for both viewing and recording, including,
    a. means for supporting and transporting a sheet carrying microimages, a sheet carrying microimages, the microimages corresponding to macro scenes recorded on the sheet, the microimages of and corresponding to any macro scene being dispersed over the area of the sheet,
    b. means for illuminating dispersed portions of said sheet,
    c. an aperture plate carrying lenses at fixed locations thereover, light cones passing through said lenses,
    d. means for folding light from each light cone associated with each of said lenses to effectively shorten the length of each light cone, e. means for limiting the solid angular extent of the light cones, f. a rear projection viewing screen for receiving an image contained within each projected light cone, g. said (b) means for illuminating being defined by a plurality of lighting sheets, each defined by a totally internally reflecting sheet having an array of reflectors between the two surfaces of the sheet, said reflectors being positioned and arranged so as to provide an array of sources of light emanating from one surface of said sheet, said (d) means for folding light cones including a plurality of parallel mirrors, a pair of said mirrors sandwiching the lighting sheets, the lighting sheets being parallel and making an angle of less than 90 degrees with the surface of the aperture plate, a reflecting surface on the side of said sheet which carries microimages opposite to the aperture plate, whereby light exiting from the reflectors in the lighting sheets passes through the lenses to the reflecting surface to illuminate microimages.

2. A compact optical device for both viewing and recording, including, a. means for supporting and transporting a sheet carrying microimages, a sheet carrying microimages, the microimages corresponding to macro scenes recorded on the sheet, the microimages of and corresponding to any macro scene being dispersed over the area of the sheet, b. means for illuminating dispersed portions of said sheet, c. an aperture plate carrying lenses at fixed locations thereover, light cones passing through said lenses, d. means for folding light from each light cone associated with each of said lenses to effectively shorten the length of each light cone, e. means for limiting the solid angular extent of the light cones, f. a rear projection viewing screen for receiving an image contained within each projected light cone, g. said (b) means for illuminating including a lighting sheet, which sheet is defined by a totally internally reflecting sheet having an array of reflectors between the two surfaces of the sheet, said reflectors being positioned and arranged so as to provide an array of sources of light emanating from one surface of said sheet, for directing light normally out of the sheet, which sheet also defines said aperture plate, the optical device further including a mirror above each said lens.

* * * * *